(12) United States Patent
Pierce et al.

(10) Patent No.: US 7,160,083 B2
(45) Date of Patent: Jan. 9, 2007

(54) METHOD AND APPARATUS FOR WIND TURBINE ROTOR LOAD CONTROL

(75) Inventors: Kirk G. Pierce, Tehachapi, CA (US); David Lawrence LeMieux, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/357,522

(22) Filed: Feb. 3, 2003

(65) Prior Publication Data

US 2004/0151577 A1 Aug. 5, 2004

(51) Int. Cl.
*B63H 3/01* (2006.01)

(52) U.S. Cl. .............................. 416/61; 416/43; 415/26; 415/48; 415/118

(58) Field of Classification Search ................. 415/4.1, 415/1, 118, 26, 49, 48; 416/35, 41, 43, 30, 416/89, 1, 31, 36, 47–48, 61, 40, 44
See application file for complete search history.

(56) References Cited

U.S. PATENT DOCUMENTS

| | | | |
|---|---|---|---|
| 4,298,313 A * | 11/1981 | Hohenemser | 416/98 |
| 4,420,692 A * | 12/1983 | Kos et al. | 290/44 |
| 4,435,647 A * | 3/1984 | Harner et al. | 290/44 |
| 4,495,423 A * | 1/1985 | Rogers | 290/44 |
| 4,613,762 A * | 9/1986 | Soderholm | 290/44 |
| 5,140,856 A * | 8/1992 | Larsen | 416/144 |
| 5,225,712 A * | 7/1993 | Erdman | 290/44 |
| 6,361,275 B1 * | 3/2002 | Wobben | 416/33 |
| 6,940,186 B1 * | 9/2005 | Weitkamp | 290/44 |

FOREIGN PATENT DOCUMENTS

WO   WO 01/33075 A1   5/2001

OTHER PUBLICATIONS

P. Caselitz et al., "Reduction of Fatigue Loads on Wind Energy Converters by Advanced Control Methods," European Wind Energy Conference, Oct. 1997, pp. 1-4, Dublin Castle, Ireland.
N. Kelley et al., "The NREL Large-Scale Turbine Inflow and Response Experiment—Preliminary Results," National Wind Technology Center, National Renewable Energy Laboratory, pp. 412-426, #AIAA-2002-0064, Golden, Colorado.
David Lawrence LeMieux, "Rotor Blade Fatigue Reduction on Wind Turbines Using Pitch Control," A Thesis submitted to the Department of General Engineering, Montanna Tech of The University of Montana, May 2001, pp. i-109, Butte, Montana, USA.

* cited by examiner

*Primary Examiner*—Igor Kershteyn
(74) *Attorney, Agent, or Firm*—Blakely, Sokoloff, Taylor & Zafman LLP

(57) ABSTRACT

Vertical and horizontal wind shears, yaw misalignment and/or turbulence act together to produce asymmetric loading across a wind turbine rotor. The resultant load produces bending moments in the blades that are reacted through the hub and subsequently to the low-speed shaft. As a result, the main shaft and main shaft flange are displaced from their at rest or non-aerodynamic load positions. The amount of shaft flange displacement is measured using one or more sensors. The output signals from the sensors are used to determine the magnitude and/or the orientation of the resultant rotor load. This information is used to effect the blade pitch change needed to reduce the load and thereby reduce fatigue and loading on various turbine components.

27 Claims, 12 Drawing Sheets

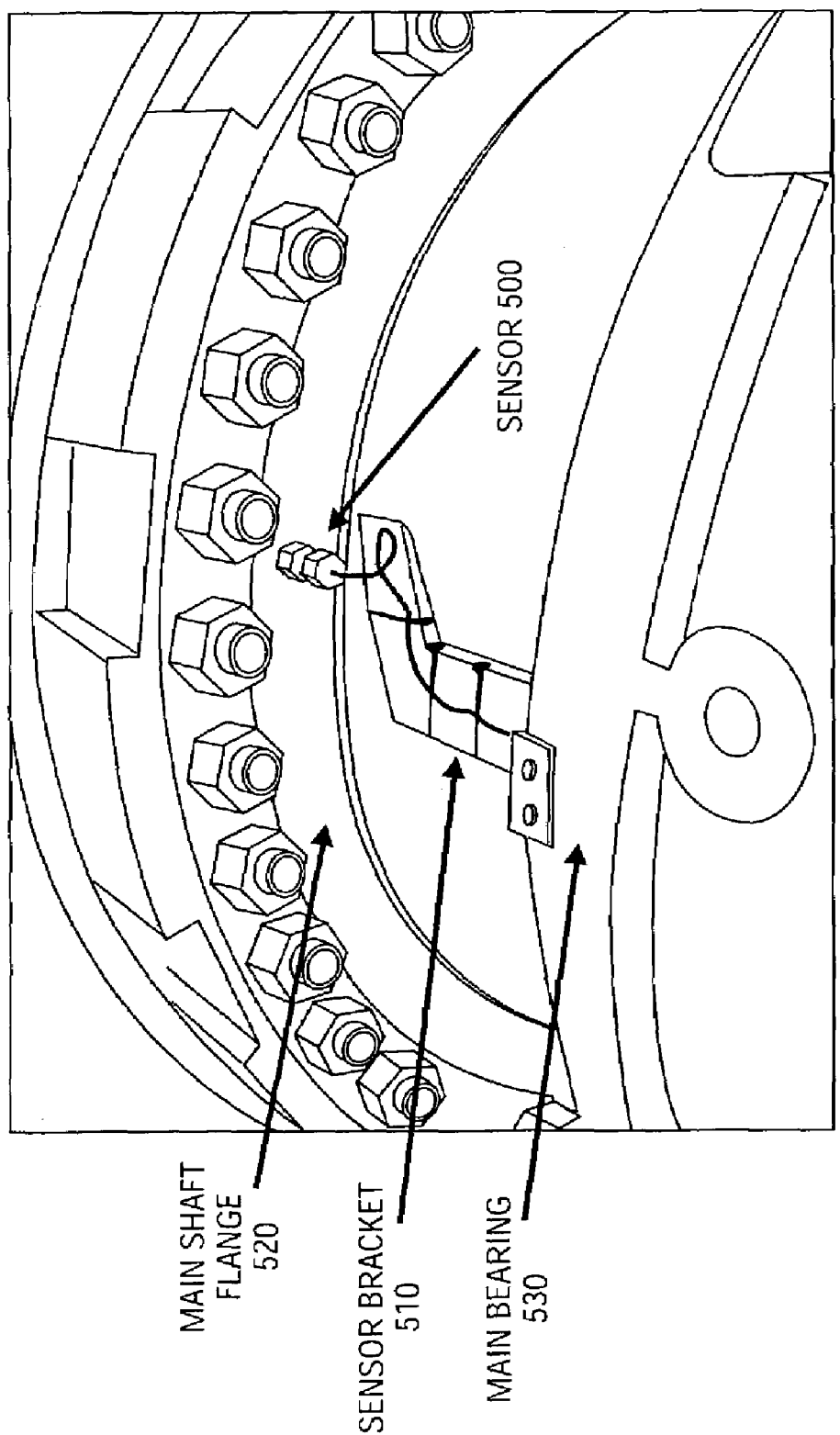

METHOD AND APPARATUS FOR WIND TURBINE ROTOR LOAD CONTROL

FIELD

The invention relates to wind turbines. More particularly, the invention relates to wind turbine load control.

BACKGROUND

Utility grade wind turbines (i.e., wind turbines designed to provide electrical power to a utility grid) can have large rotors (e.g., 30 or more meters in diameter). Asymmetric loading across these rotors occurs due to vertical and horizontal wind shears, yaw misalignment and turbulence. These asymmetric loads contribute to extreme loads, and the quantity of fatigue cycles on the rotor blades and other wind turbine components.

Various techniques have been developed to reduce fatigue caused by asymmetric loading of rotors. For example, in "Reduction of Fatigue Loads on Wind Energy Converters by Advanced Control Methods" by P. Caselitz, et al., European Wind Energy Conference, October 1997, Dublin Castle, Ireland, a technique for active damping of tower oscillations is disclosed. However, the techniques of Caselitz, et al. are based on tilt and yaw of the tower, which provides only general information about the loads on individual wind turbine components.

BRIEF DESCRIPTION OF THE DRAWINGS

The invention is illustrated by way of example, and not by way of limitation, in the figures of the accompanying drawings in which like reference numerals refer to similar elements.

FIG. 5a illustrates a first proximity sensor facing the main shaft flange from a view facing the hub.

DETAILED DESCRIPTION

Vertical and horizontal wind shears, yaw misalignment and/or turbulence act together to produce asymmetric loading across a wind turbine rotor. The resultant load produces bending moments in the blades that are reacted through the hub and subsequently to the low-speed shaft. As a result, the main shaft and main shaft flange are displaced from their at rest positions. The amount of shaft flange displacement can be measured using one or more sensors. The output signals from the sensors can then be used to determine the magnitude and/or the orientation of the resultant rotor load. Some types of turbines do not have a main shaft or a main shaft flange. In these turbines, any surface on the rotor side that can be deflected relative to the nacelle can be used to measure loading. This can be, for example, a machined hub surface, a mounting flange or an attached ring plate.

The blade pitch change needed to reduce the load, and thereby reduce fatigue and loading on various turbine components, can be determined. In one embodiment, a Parks DQ transformation, a bias estimation method calculation and/or other control techniques are used to calculate the pitch increment for each rotor blade to reduce the overall asymmetric rotor loading. Fatigue and extreme loads of the rotor blades and other turbine components can be reduced using this technique.

Determination of the rotor loading can be obtained from sensors that measure displacement or strain of the shaft flange using sensor technologies based on acoustic, optical, magnetic, capacitive or inductive field effects. In one embodiment, proximity sensors are used to measure the main shaft flange displacement relative to a non-deflecting reference frame. The non-deflecting reference frame may be, for example, the bedplate or the housing of the low-speed shaft main bearing. The deflecting frame may be the main shaft flange, the hub, or other surfaces on the rotor or shaft. In one embodiment, a minimum of three sensors measuring shaft flange displacement are used to distinguish between shaft bending and shaft axial displacement.

In one embodiment, for purposes of sensor redundancy, four sensors are used. Using four sensors, in one embodiment the sensors are located 90° apart on the flange surface. As described in greater detail below, additional and/or different sensors can also be used.

Figure 1:
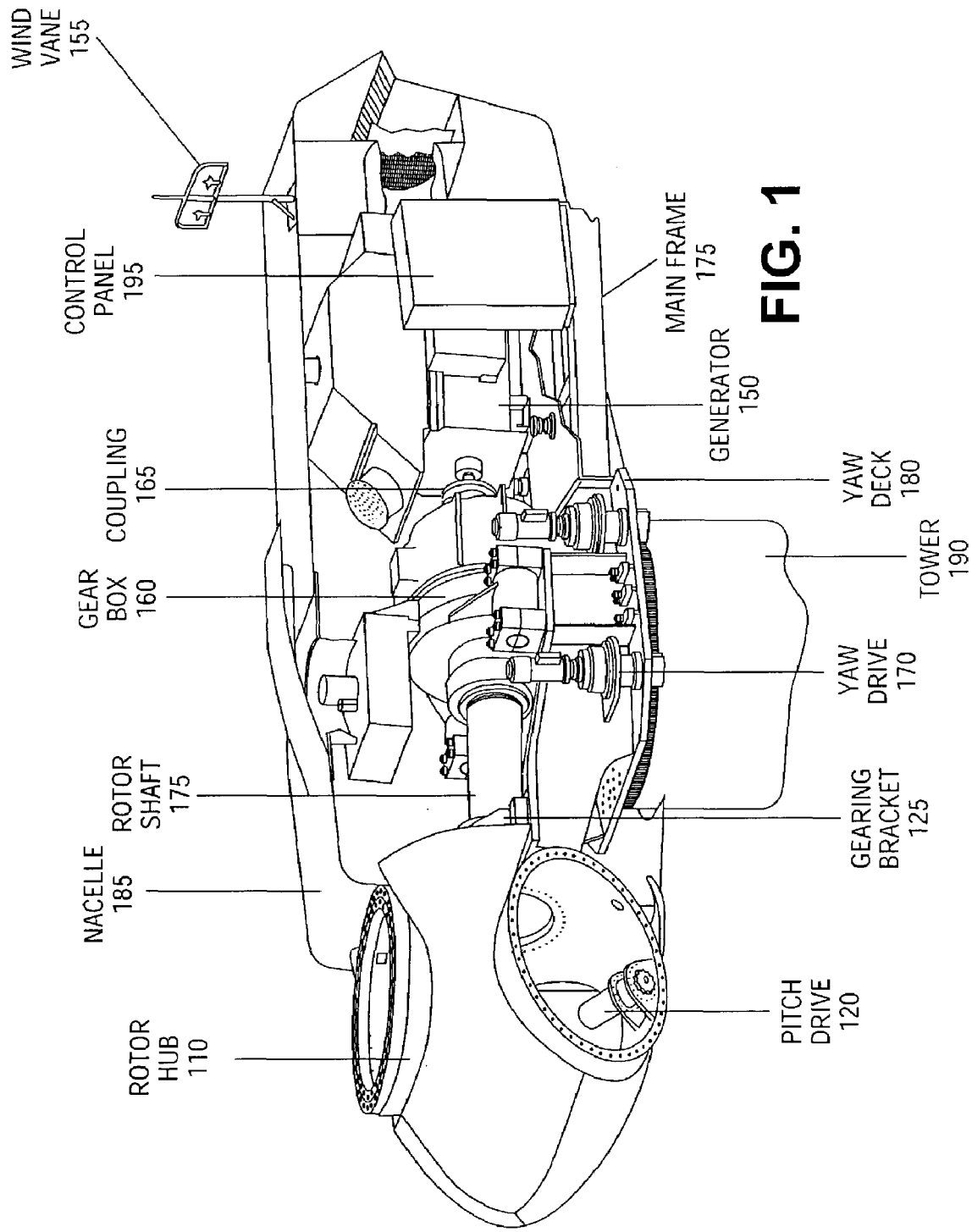
FIG. 1 is one embodiment of a portion of a wind turbine.

FIG. 1 is one embodiment of a portion of a wind turbine. The components of FIG. 1, except for rotor hub 110, are typically housed in nacelle 185 atop tower 190. The height of tower 190 can be selected based on factors and conditions well-known in the art. In one embodiment, wind turbine components include a distributed microcontroller based control system including control panel 195. In such an embodiment, multiple microcontrollers (not shown in FIG. 1) are used for overall system monitoring and control including pitch and speed regulation, high-speed shaft and yaw brake application, yaw and pump motor application and fault monitoring. Alternative distributed or centralized control architectures can also be used.

In one embodiment, the control system provides control signals to pitch drive 120 to control the pitch of blades (not shown in FIG. 1) that drive rotor hub 110 as a result of aerodynamic forces on the blades. In one embodiment, rotor hub 110 receives three blades; however, any number of blades can be used. In one embodiment, the pitch of the blades can be individually controlled by pitch drive 120. Rotor hub 110 and the turbine blades combine to form a wind turbine rotor.

The turbine drive train includes rotor shaft 175 connected to rotor hub 110 and gear box 160 that, in one embodiment, drives a high speed shaft enclosed within gear box 160. The high speed shaft is used to drive generator 150. In one embodiment, generator 150 is mounted on main frame 175. In one embodiment, rotor torque is transmitted through a torque limiting coupling 165. Other types of generators, for example, wound rotor induction generators can also be used. Yaw drive 170 and yaw deck 180 provide a yaw control system for the wind turbine. In one embodiment, the yaw system is electrically operated and controlled by the control system based on information received from wind vane 155 mounted on nacelle 185.

As described in greater detail below, one or more proximity sensors connected to the nacelle fixed frame determine a deflection of a shaft flange from a predetermined resting or "no load" position. The shaft flange is positioned around rotor shaft 175 where rotor shaft 175 exits rotor hub 110. The shaft flange is illustrated in greater detail in the figures discussed below, for example, FIGS. 5a through 5c.

In one embodiment, the "no load" position is determined during an initialization process, using turbine controller computations of main shaft flange sensor signals during a rotor slow roll operation (this can occur at system start-up with all rotor blades pitched to, for example, 65-degrees). Deflection is measured as bending of the low-speed shaft and/or main shaft flange resulting from applied aerodynamic bending moments on the rotor blade(s).

Using data from the sensors, a turbine controller can determine the loads on the blades that caused the deflection detected by the sensors. With this information, the turbine controller can cause the pitch of the blades to be changed to reduce the load on the blades or to reduce the asymmetrical nature of the loads (i.e., to cause a more symmetric load on the rotor).

Figure 2:
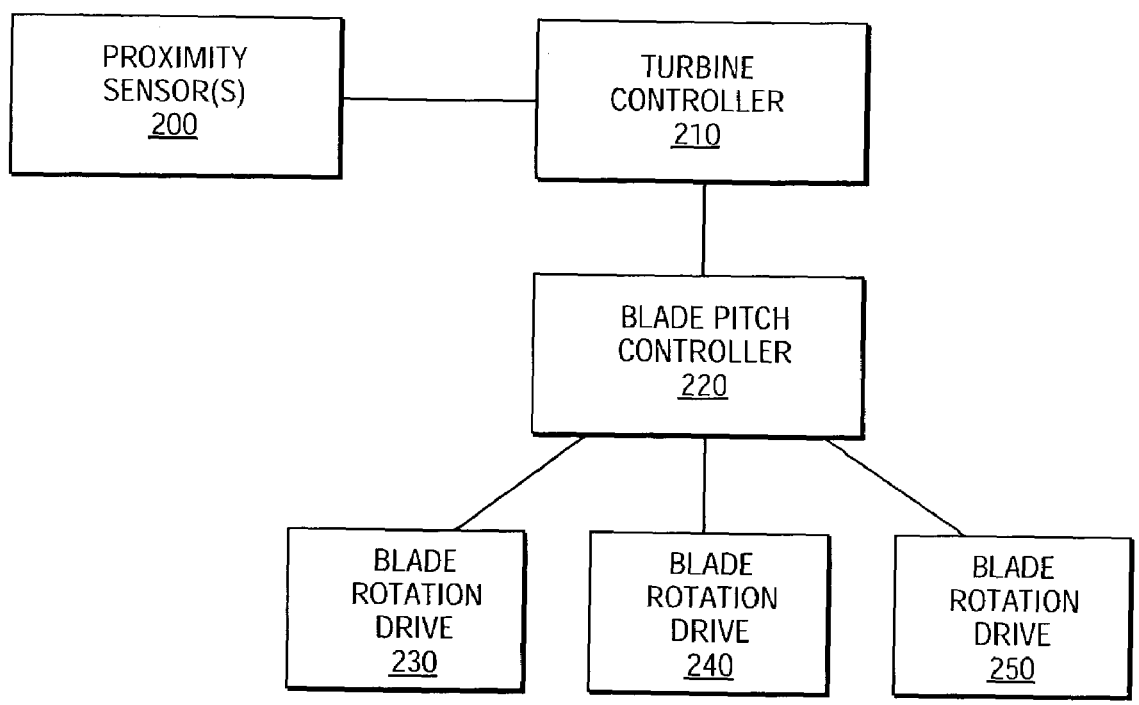
FIG. 2 is a block diagram of one embodiment of a system to control blade pitch based on sensor measurements.

FIG. 2 is a block diagram of one embodiment of a system to control blade pitch based on sensor measurements. Proximity sensor(s) 200 generate signals in response to deflection of wind turbine components, for example, the main shaft flange. Turbine controller 210 is coupled to sensor(s) 200 to receive the signals generated by sensor(s) 200. Turbine controller 210 analyzes the signals to determine the forces that caused the deflection of the turbine component.

In one embodiment, turbine controller 210 includes a processor that receives signals (either analog or digital signals) that indicate the output of sensor(s) 200. The processor can be, for example, a general purpose processor that executes instructions, a hardwired control circuit, or a combination of a general purpose processor and hardwired circuitry. In response to the signals received from sensor(s) 200, turbine controller generates control signals that are transmitted to blade pitch controller 220.

Blade pitch controller 220 is coupled to one or more blade rotation drives (e.g., 230, 240, 250) that control the pitch of the blades of the wind turbine. By varying the pitch of the blades, the magnitude and/or the duration of loads placed on the turbine can be reduced thereby improving the overall performance of the wind turbine.

In one embodiment, for feedback control, input signals are blade azimuth position (for all blades), speed of low-speed shaft, and generator output (feedback control is only used at above rate conditions, although it could be used at all conditions in the future). Blade azimuth and low-speed shaft speed can be obtained using, for example, digital output proximity sensors producing pulses from the low-speed shaft bolt pattern.

Figure 3:
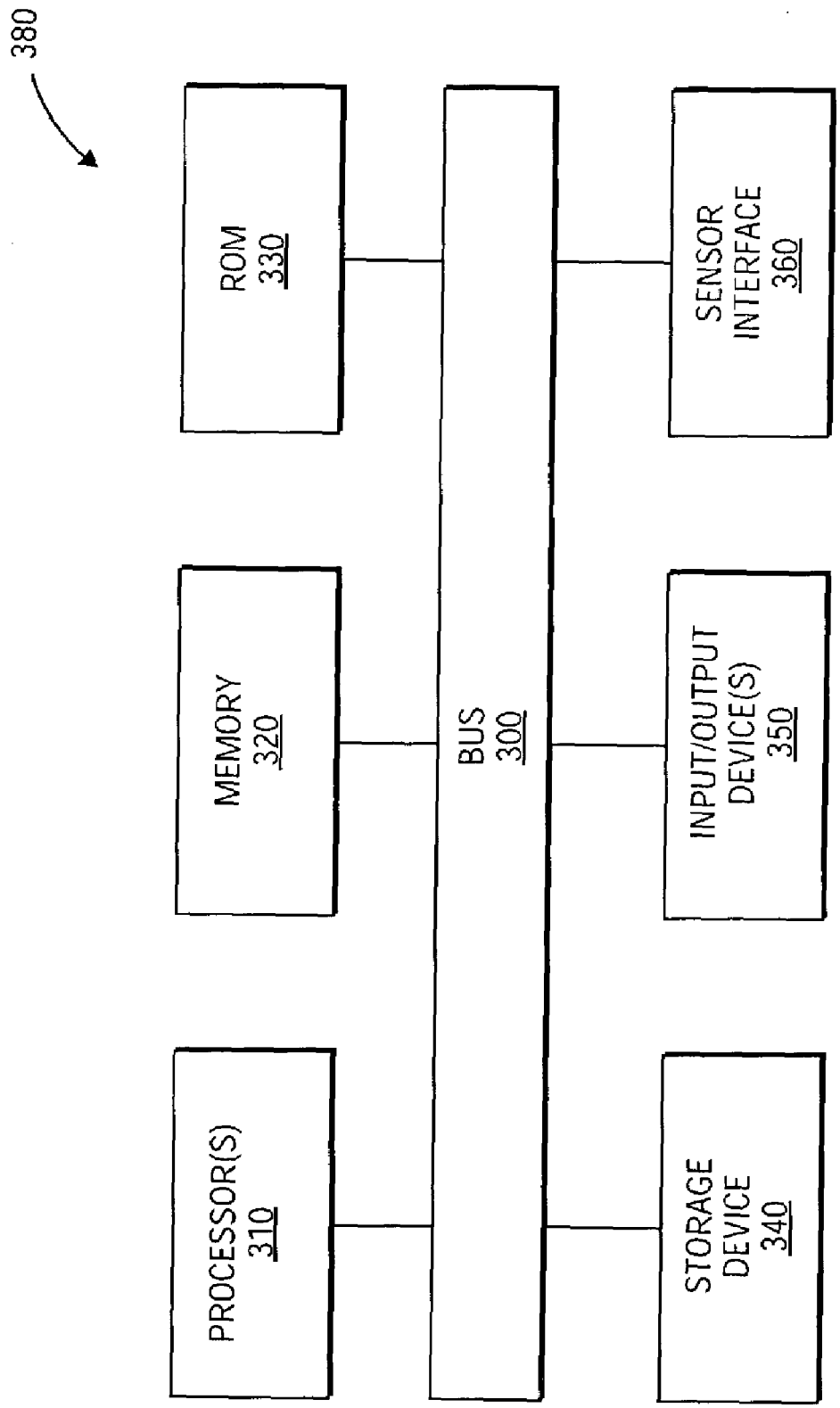
FIG. 3 is a block diagram of one embodiment of a turbine controller.

FIG. 3 is a block diagram of one embodiment of a turbine controller. Turbine controller 380 includes bus 300 or other communication device to communicate information, and processor 310 coupled to bus 300 to process information. While turbine controller 380 is illustrated with a single processor, turbine controller 380 can include multiple processors and/or co-processors. Turbine controller 380 further includes random access memory (RAM) or other dynamic storage device 320 (referred to as memory), coupled to bus 300 to store information and instructions to be executed by processor 310. Memory 320 also can be used to store temporary variables or other intermediate information during execution of instructions by processor 310.

Turbine controller 380 can also include read only memory (ROM) and/or other static storage device 330 coupled to bus 300 to store static information and instructions for processor 310. Data storage device 340 is coupled to bus 300 to store information and instructions. Input/output device(s) 350 can include any device known in the art to provide input data to turbine controller 380 and/or receive output data from turbine controller 380.

Instructions are provided to memory from a storage device, such as magnetic disk, a read-only memory (ROM) integrated circuit, CD-ROM, DVD, via a remote connection that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

Sensor interface 360 is an interface that allows turbine controller 380 to communicate with one or more sensors within a wind turbine. For example, sensor interface 360 can be coupled to receive output signals from one or more sensors that detect deflection or loading of wind turbine components as described above. Sensor interface 360 can be, for example, an analog-to-digital converter that converts an analog voltage signal generated by the sensors to a multi-bit digital signal to be used by processor(s) 310.

Processor(s) 310 can then analyze the data and transmit data to a blade pitch controller through input/output device (s) 350 to cause the blade pitch controller to change the pitch of one or more blades of the wind turbine. Processor(s) 310 can also take other actions in response to the signals from the sensors. For example, processor(s) 310 can cause a brake to be applied to stop or slow rotation of the hub or of a rotating shaft.

Figure 4:
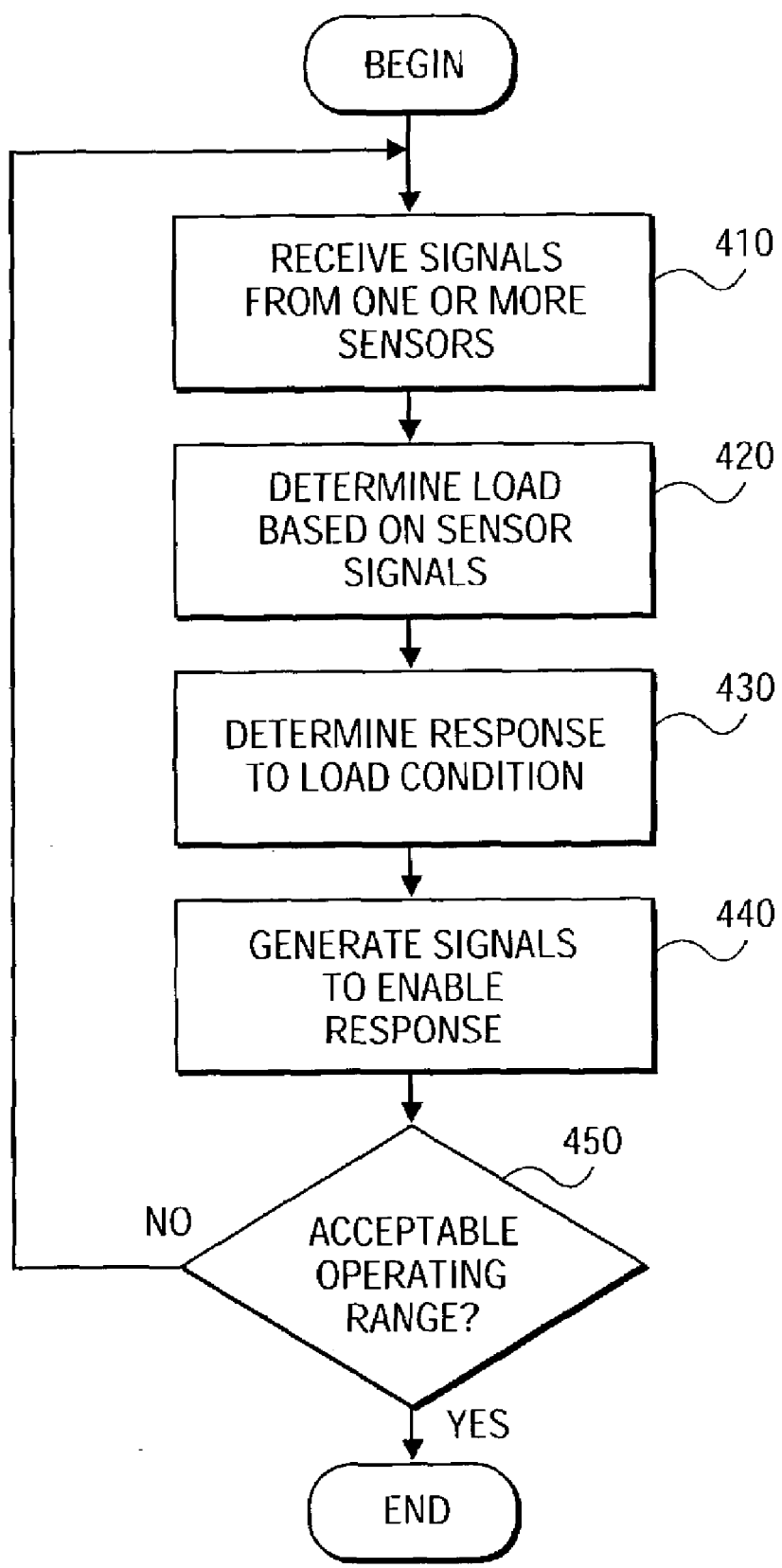
FIG. 4 is a flow diagram of one embodiment of a process for controlling wind turbine blade pitch in response to component displacement.

FIG. 4 is a flow diagram of one embodiment of a process for controlling wind turbine blade pitch in response to component (e.g., main shaft flange) displacement. Signals from one or more sensors are received (processing block 410). The component receiving the signals (e.g., a processor, an analog-to-digital converter) is coupled with the sensors and converts the signals to a usable format, if necessary.

In response to the signals from the sensors, control circuitry (e.g., a processor, hardwired control circuits) determines the load on one or more wind turbine components using the signals from the sensors (processing block 420). The control circuitry can use any mathematical equations known in the art to convert between the input data (e.g., magnitude of displacement) to relevant load data (e.g., forces exerted on a blade of the wind turbine). The load on the rotor blades that caused the displacement as well as any asymmetrical properties of the load can also be determined by the control circuitry.

The control circuitry determines a response to the load condition (processing block 430). For example, in response to an increased load on a blade of the turbine, the control circuitry can determine that the response should be to change the pitch of one or more of the blades of the wind turbine. As another example, the control circuitry can determine that the response should be the application of a brake to stop or slow rotation of the hub.

The control circuitry generates the signal to enable the selected response (processing block 440). For example, the control circuitry can generate a signal in the form of, for example, a data packet or a set of control signals transmitted over individual control lines, to cause a blade pitch controller to change the pitch of one or more blades. If the selected response fails to cause the wind turbine to operate within an acceptable operating range (processing block 450), the process can be repeated as necessary.

FIG. 5*a* illustrates a first proximity sensor facing the main shaft flange from a view facing the hub. In the example of FIG. 5*a*, proximity sensor 500 is connected to a sensor bracket that is that is connected between main shaft flange 520 and main bearing 530. Other connection techniques as well as other locations can also be used. Any type of proximity sensor known in the art can be used.

Figure 5B:
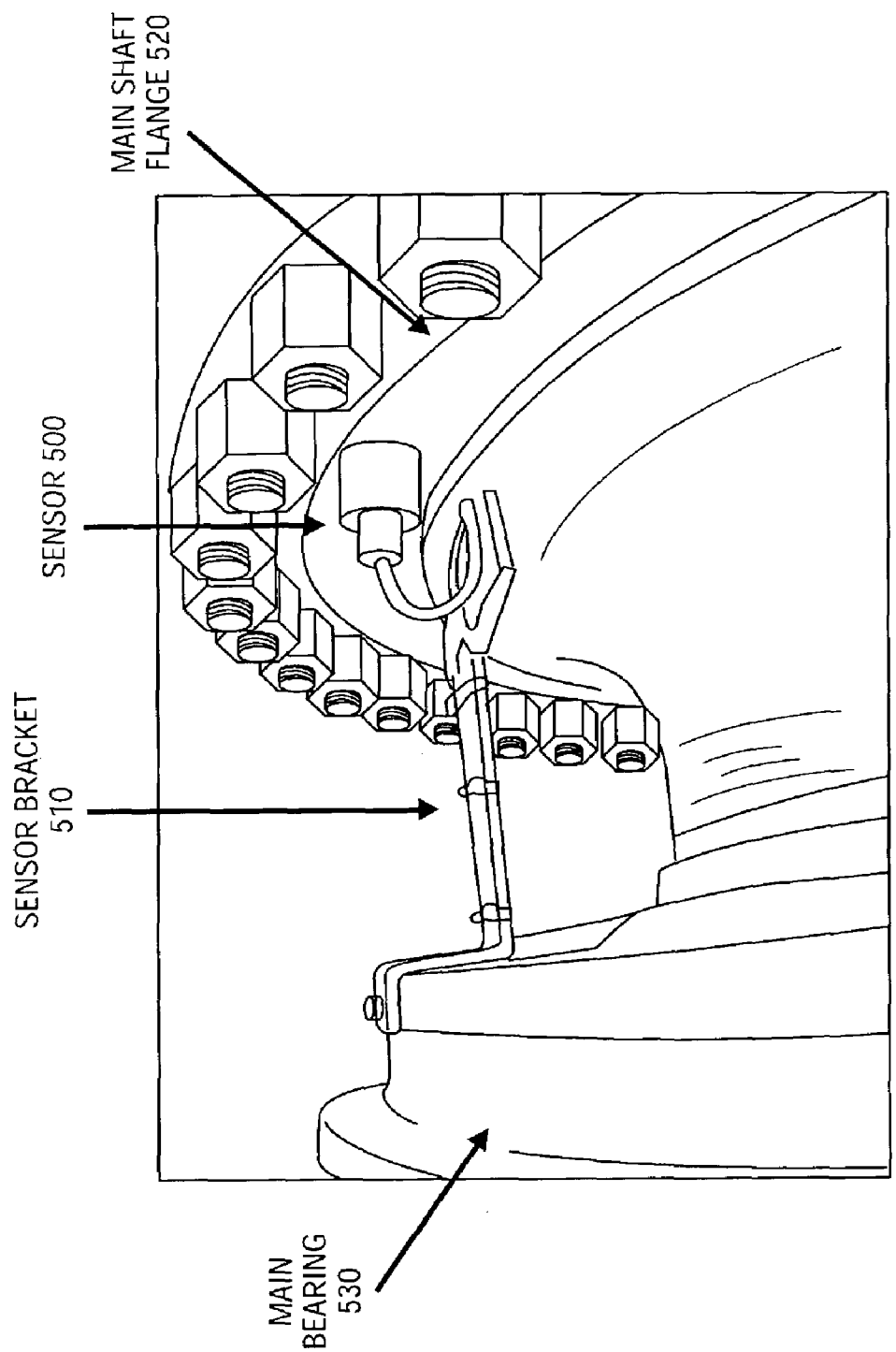
FIG. 5b illustrates the first proximity sensor facing the main shaft flange from a side view.

Sensor 500 detects motion of main shaft flange 520 in one direction. Use of additional sensors (for example, the sensor of FIG. 5*c*, described below) can allow a turbine controller to determine deflection of main shaft flange 520 in three dimensions and thereby determine the loads on various turbine components that caused the deflection. FIG. 5*b* illustrates the first proximity sensor facing the main shaft flange from a side view.

Figure 5C:
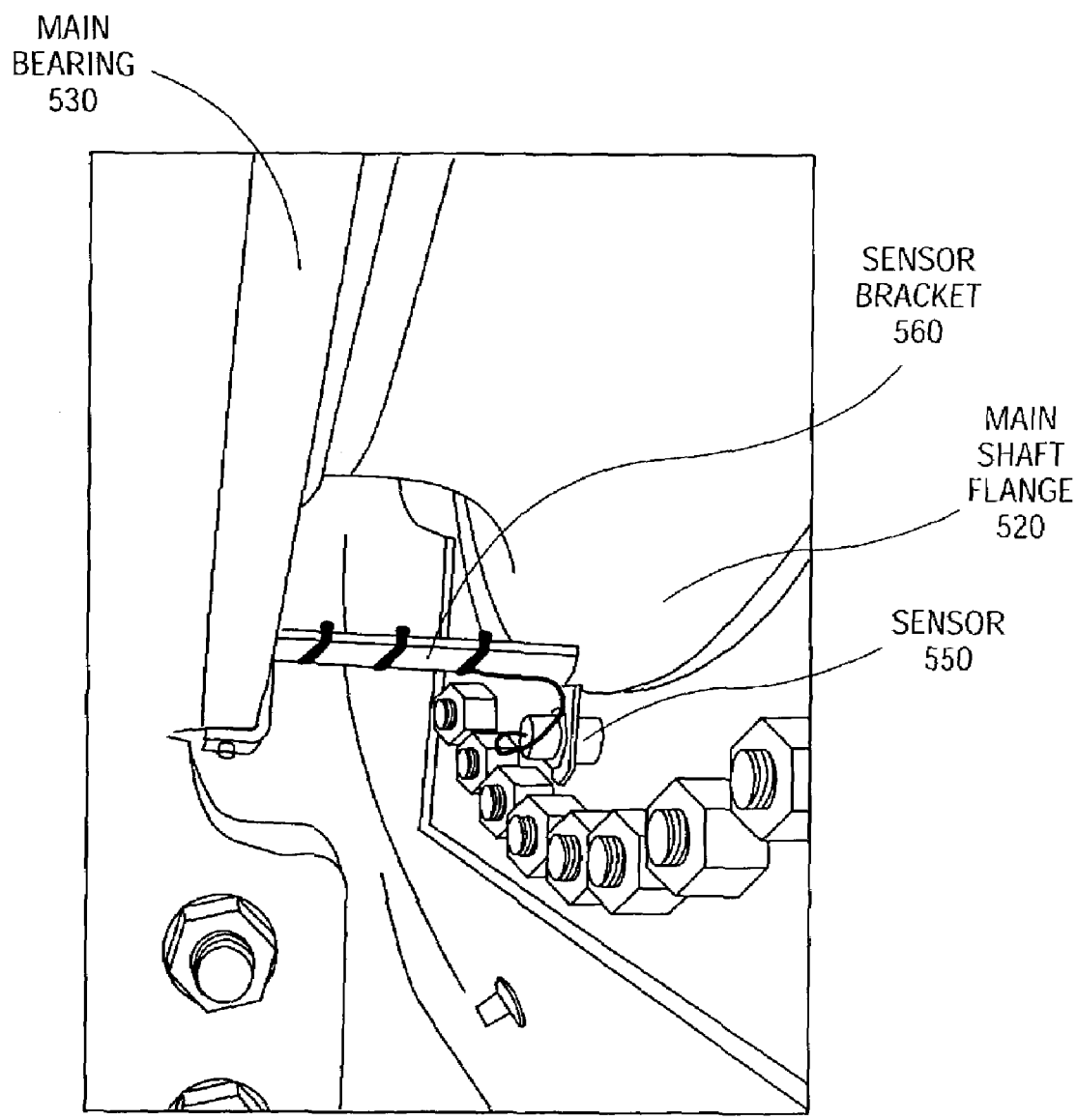
FIG. 5c illustrates a second proximity sensor facing the main shaft flange at a 90° angle with respect to the first proximity sensor.

FIG. 5*c* illustrates a second proximity sensor facing the main shaft flange at a 90° angle with respect to the first proximity sensor. In one embodiment, sensor 550 is positioned in a plane that is orthogonal to the plane of sensor 500 (in FIGS. 5*a* and 5*b*). In one embodiment, sensor bracket 560 is connected between main shaft flange 520 and main bearing 530. Other connections and other positions can also be used.

Additional and/or other sensors can be used to determine deflection of components other than the main shaft flange. For example, in one embodiment, one or more of the blades of the wind turbine have a proximity sensor to sense forces on the blades. The proximity sensors in the blades are coupled to the turbine controller to provide data to the turbine controller that can be used to determine loads placed on the blades. The turbine controller can, for example, change the pitch of the blades to reduce the loads placed on the blades by wind or other environmental conditions.

Figure 6:
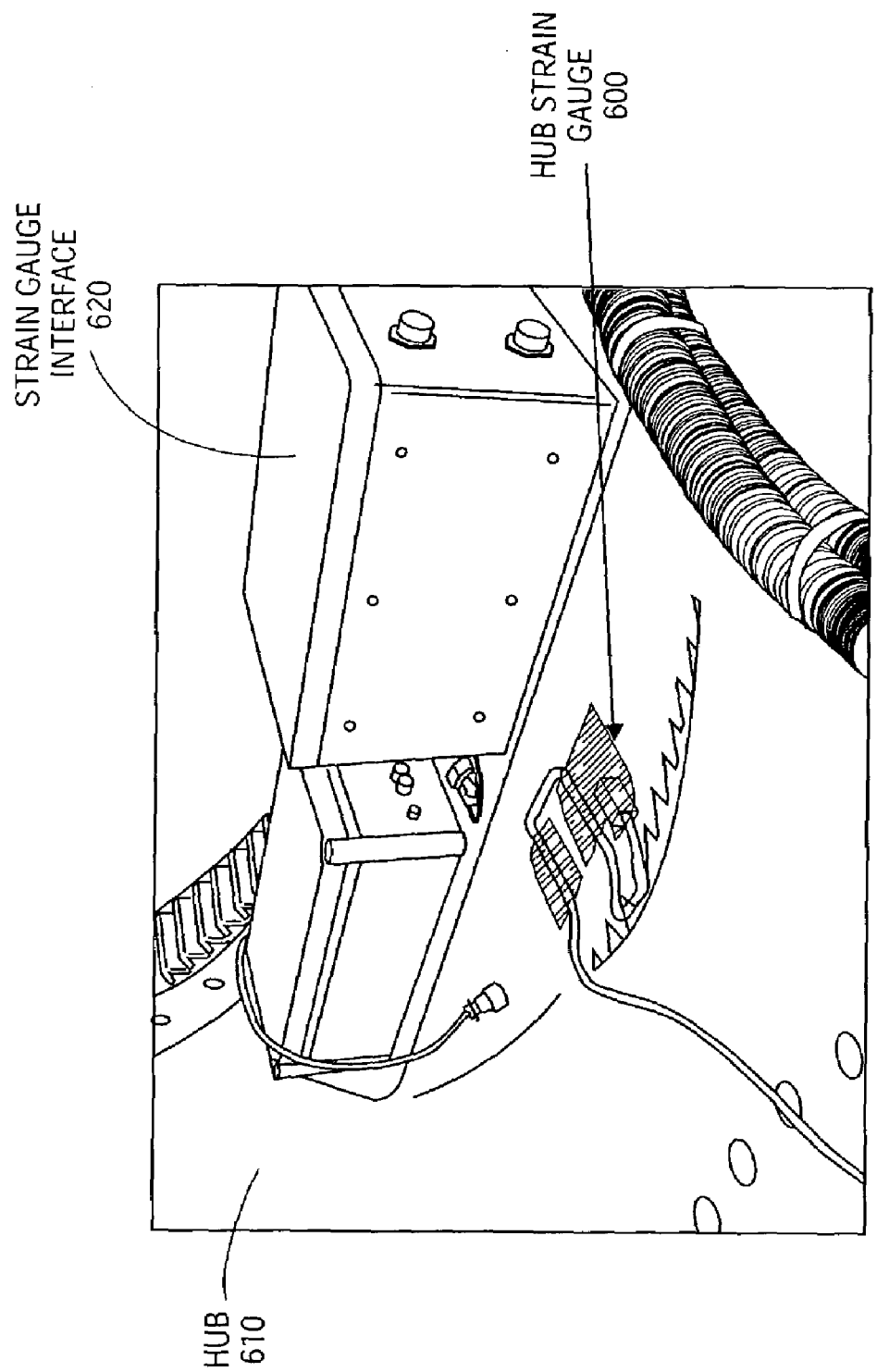
FIG. 6 illustrates one embodiment of a hub having a strain gauge.

FIG. 6 illustrates one embodiment of a hub having a strain gauge. In one embodiment, as illustrated in FIG. 6, quarter bridge welded strain gauge (e.g., 600) are located inside hub 610, near the pitch bearing, and adjacent to the nacelle. One strain gauge is used for each of three axes. Other locations and/or a different number of strain gauges can also be used. In one embodiment, data logger 620 is also located inside of hub 610 and is configured to acquire data from the strain gauge(s).

Figure 7:
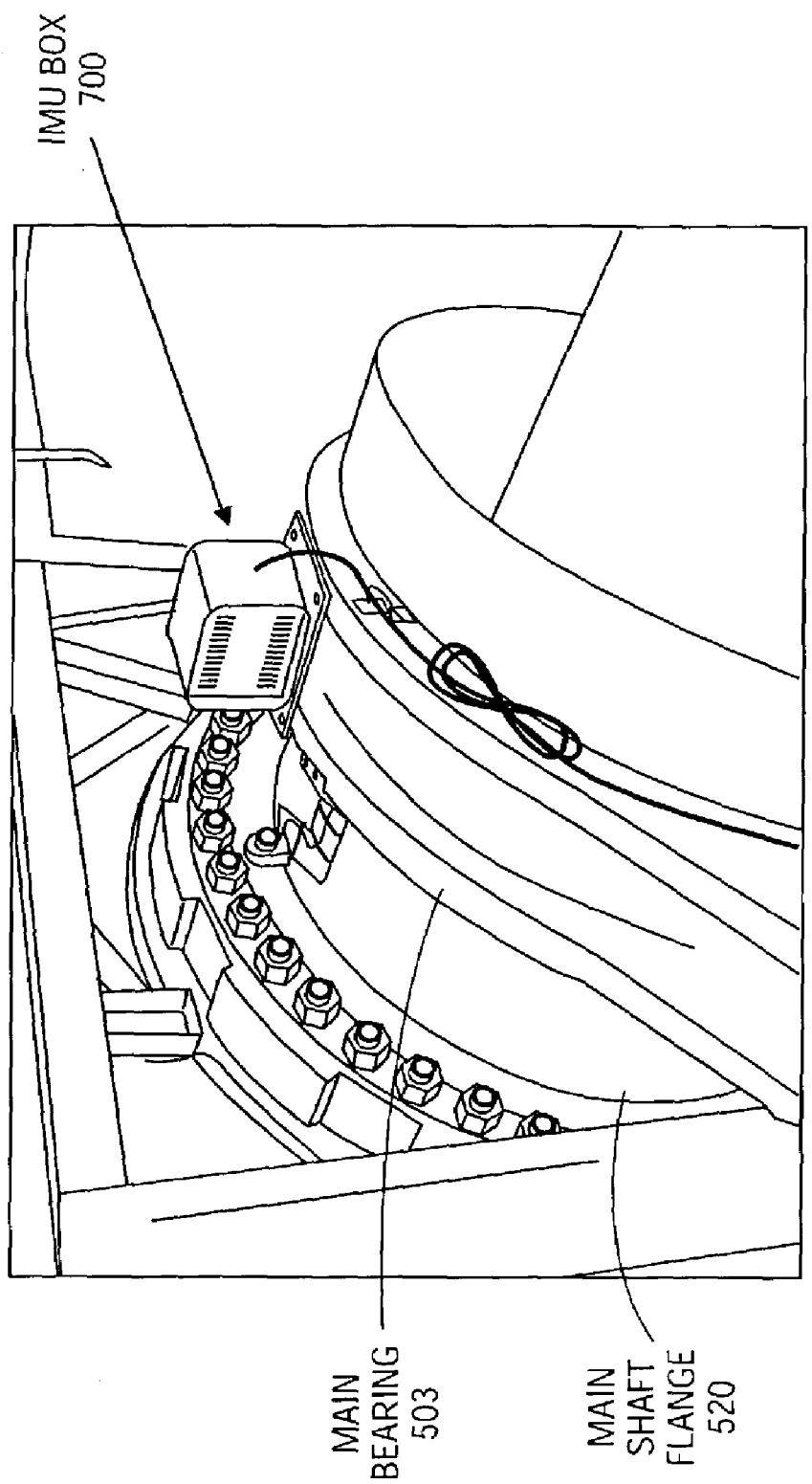
FIG. 7 illustrates one embodiment of a wind turbine having an inertial measurement unit (IMU).

FIG. 7 illustrates one embodiment of a wind turbine having an inertial measurement unit (IMU). In one embodiment, IMU 700 is connected to main shaft flange 520. IMU 700 is a gyroscope and accelerometer-based device that provides measurement of roll, pitch and yaw angles, and three axis accelerations. IMU 700 is coupled to a turbine controller that determines loads based on IMU measurements.

Figure 8:
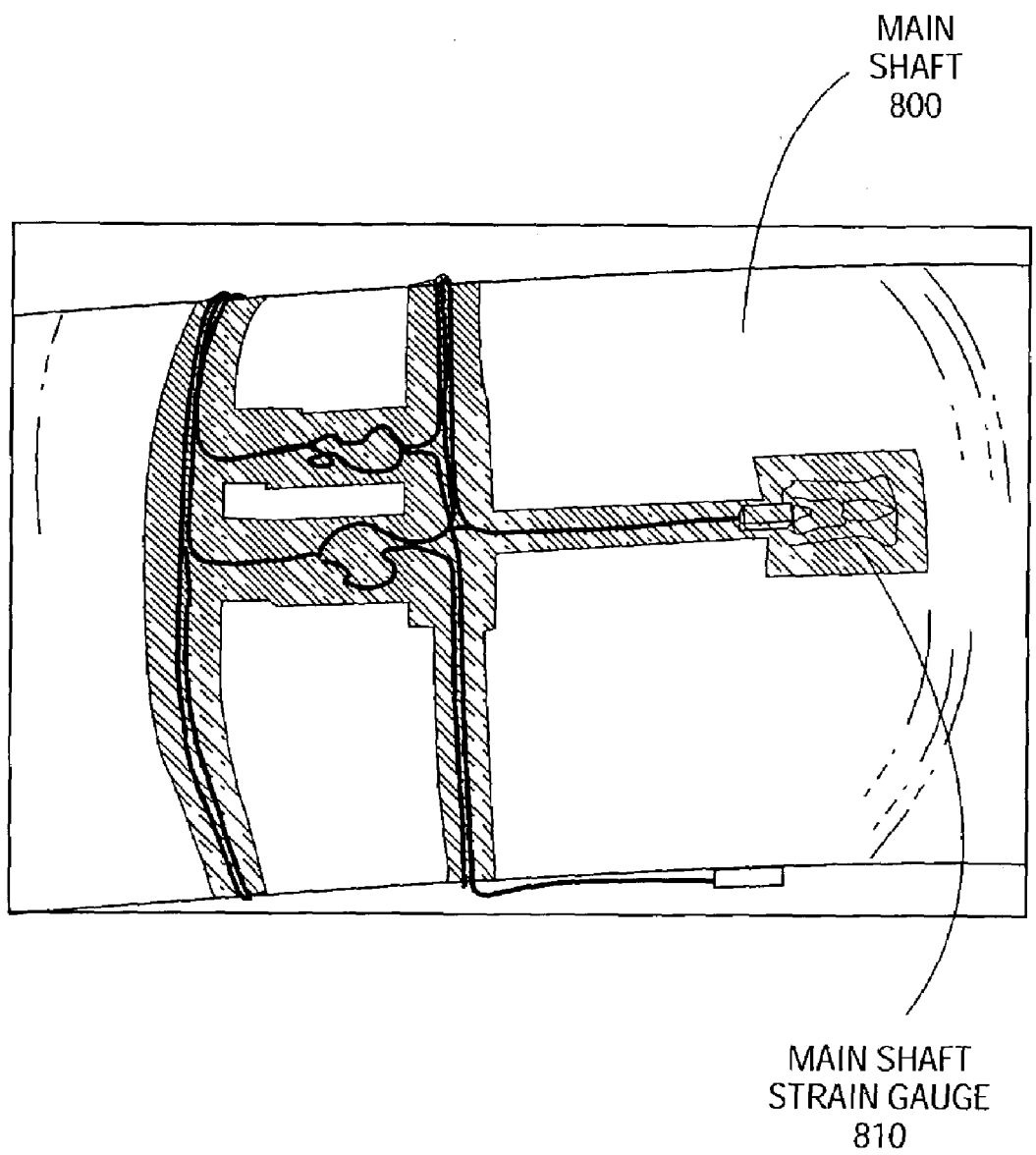
FIG. 8 illustrates one embodiment of strain gauges attached to the main shaft.

FIG. 8 illustrates one embodiment of strain gauges attached to the main shaft. In one embodiment, the main shaft is instrumented with weldable strain gauges at 0°, 45° and 90° azimuth. Zero degrees azimuth is defined as blade number one positioned vertically. Alternate positions can also be used for the main shaft strain gauges, for example, strain gauges can be positioned within one or more T-bolts. The main shaft strain gauges are coupled to the turbine controller, which analyzes the data provide by the main shaft strain gauges to determine loads placed on the main shaft and determines whether to change the pitch of the rotor blades.

Figure 9:
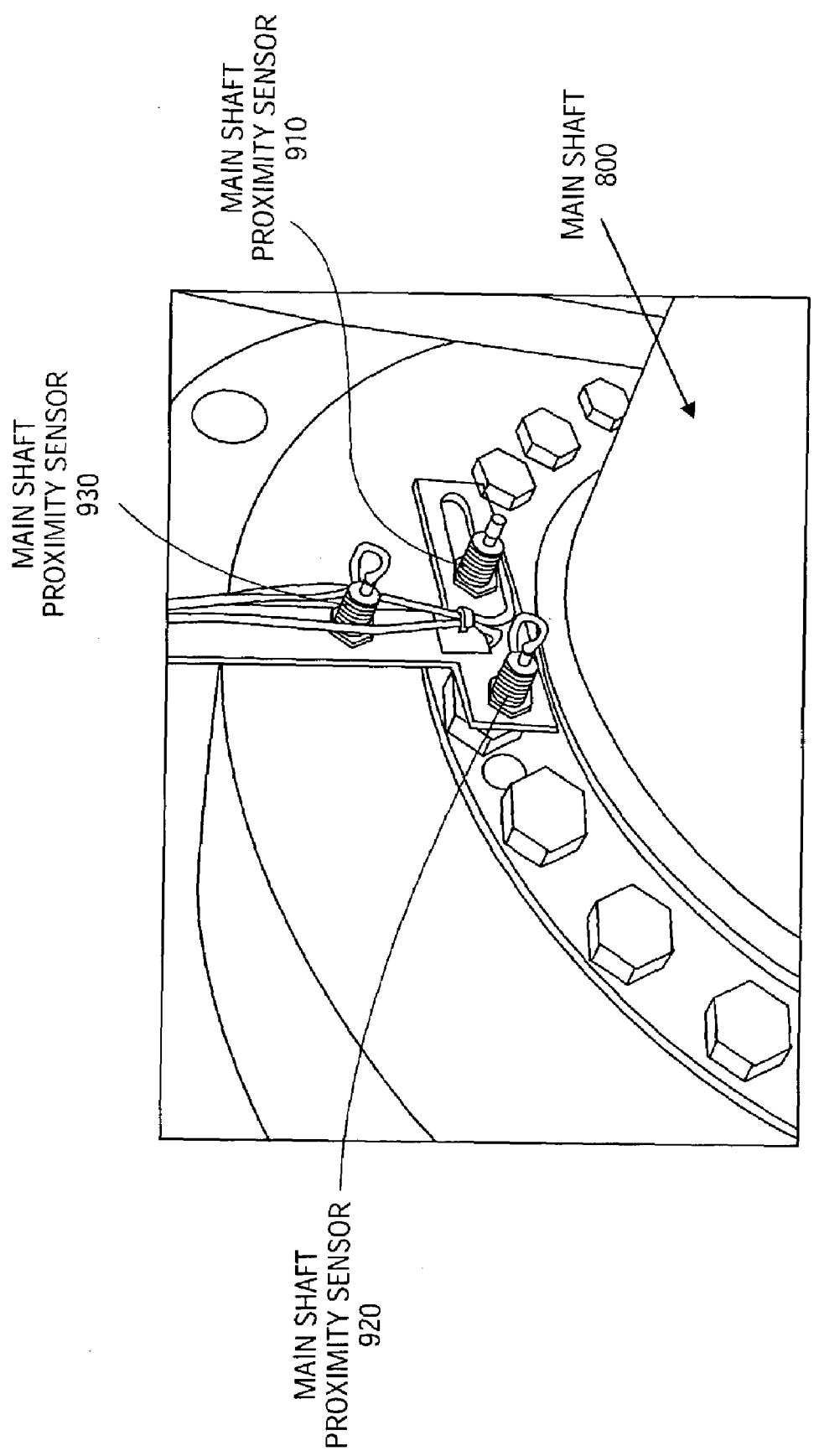
FIG. 9 illustrates one embodiment of proximity sensors attached to the main shaft.

FIG. 9 illustrates one embodiment of proximity sensors attached to the main shaft. In one embodiment main shaft proximity sensors (e.g., 910, 920, 930) are located adjacent to the gearbox. Sensors 910 and 920 detect rotational rate and sensor 930 detects blade azimuth position. Alternate sensor positions can also be used. For example, proximity sensors can be attached to the blades.

Figure 10:
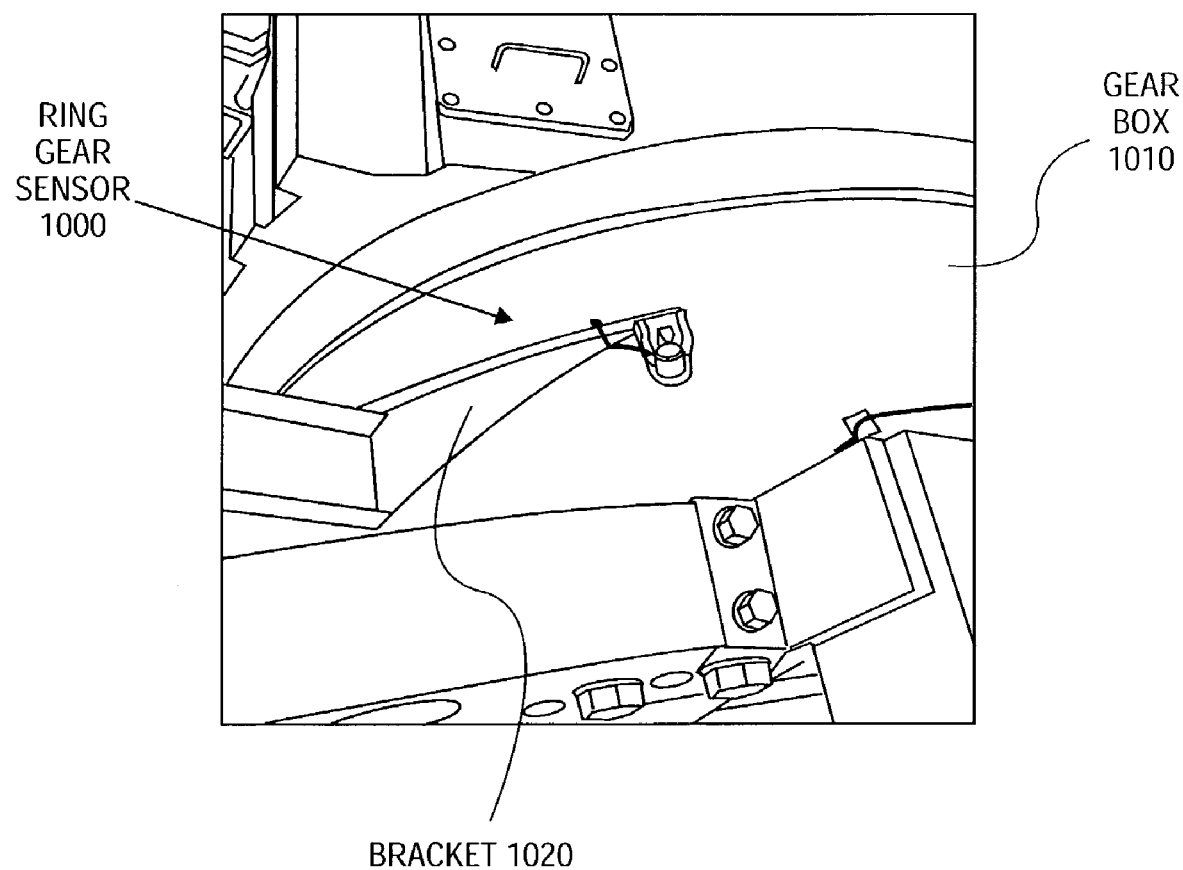
FIG. 10 illustrates one embodiment of a ring gear sensor to measure the displacement of the gear box, relative to the bedplate.

FIG. 10 illustrates one embodiment of ring gear sensor 1000 to measure the displacement of gear box 1010, relative to the bedplate. Support bracket 1020 is connected to the bedplate (not shown in FIG. 10) and positions the sensor adjacent to gear box 1010. Thus, ring gear sensor 1000 detects deflection of gear box 1010 with respect to the bedplate. In one embodiment, ring gear proximity sensors are located at 90° with respect to each other along the perimeter of the gear box ring gear.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

What is claimed is:

1. A wind turbine comprising:
   one or more sensors connected to directly detect deflection of a main shaft flange of the wind turbine from one or more predetermined positions and to generate signals corresponding to the detected deflection; and
   a control circuit coupled with the one or more sensors to receive the signals and to mitigate a load causing the deflection of the main shaft flange in response to the signals.

2. The wind turbine of claim 1 wherein the control circuit mitigates the load on the main shaft flange by controlling pitch of one or more wind turbine blades.

3. The wind turbine of claim 1 wherein the one or more sensors comprises an accelerometer connected to a main frame.

4. The wind turbine of claim 1 wherein the one or more sensors comprises a proximity sensor connected a reference frame and to the main shaft flange to measure displacement of the main shaft flange.

5. The wind turbine of claim 1 wherein the one or more sensors comprises a strain gauge attached to a hub.

6. The wind turbine of claim 1 wherein the one or more sensors comprises a strain gauge disposed within a T-bolt.

7. The wind turbine of claim 1 wherein the load comprises an asymmetrical load applied across a plurality of turbine blades and mitigating the load comprises reducing the asymmetrical nature of the load.

8. A wind turbine comprising:
   one or more proximity sensors connected to a reference frame and to a gearbox to directly measure displacement of the gearbox from one or more predetermined positions and to generate signals corresponding to the detected displacement; and a control circuit coupled with the one or more sensors to receive the signals and to mitigate a load causing the displacement the gearbox in response to the signals.

9. The wind turbine of claim 8 wherein the control circuit mitigates the load on the gear box by controlling pitch of one or more wind turbine blades.

10. A wind turbine comprising:

one or more proximity sensors to directly detect rotor blade azimuth and rotational speed; and a control circuit coupled with the one or more proximity sensors to receive the signals and to mitigate a load to the wind turbine in response to signals.

11. The wind turbine of claim 10 wherein the one or more sensors comprises a proximity sensor connected to a rotor blade.

12. The wind turbine of claim 10 wherein the control circuit mitigates the load on the wind turbine blades by controlling pitch of one or more of the wind turbine blades.

13. A wind turbine comprising:

one or more proximity sensors connected to a reference frame and to a gearbox ring-gear to directly measure displacement of the gearbox ring-gear from one or more predetermined positions and to generate signals corresponding to the detected displacement; and a control circuit coupled with the one or more proximity sensors to receive the signals and to mitigate a load causing the displacement of the gearbox ring-gear in response to signals.

14. The wind turbine of claim 13 wherein the control circuit mitigates the load on the ring-gear by controlling pitch of one or more wind turbine blades.

15. A wind turbine comprising:

means for directly detecting deflection of a main shaft flange of the wind turbine; and means for mitigating load causing deflection of the main shaft flange in response to the detected deflection of the main shaft flange.

16. The wind turbine of claim 15 wherein the means for mitigating the load compromises means for controlling pitch of one or more blades.

17. The apparatus of claim 15 further comprising:

means for determining loads placed on one or more individual wind turbine blades to cause the load; and means for changing a pitch of one or more of the wind turbine blades to reduce the asymmetrical nature of the load.

18. A method comprising:

receiving signals from one or more sensors configured to directly detect movement of a main shaft flange of a wind turbine platform atop a tower;

determining a load placed on a rotor of a wind turbine based on the signals from the one or more sensors; and causing one or more blades of the wind turbine to change pitch based on the determined load.

19. The method of claim 18 wherein the one or more sensors detect deflection of the main shaft flange from an at rest position.

20. The method of claim 18 wherein the one or more sensors determine a strain on the component.

21. The method of claim 18 wherein determining the load placed on the main shaft flange of the wind turbine comprises determining loads placed on one or more individual wind turbine blades.

22. The method of claim 18 wherein causing one or more blades of the wind turbine to change pitch comprises changing a pitch of one or more of the wind turbine blades to reduce the asymmetrical nature of the determined load.

23. A memory device within a wind turbine having stored therein instructions that, when executed, cause one or more processors to:

receive signals from one or more sensors configured to directly detect movement of a main shaft flange of a wind turbine platform atop a tower;

determine a load placed on a rotor of a wind turbine based on the signals from the one or more sensors; and cause one or more blades of the wind turbine to change pitch based on the determined load.

24. The memory device of claim 23 wherein the one or more sensors detect deflection of the main shaft flange from an at rest position.

25. The memory device of claim 23 wherein the one or more sensors determine a strain on the component.

26. The memory device of claim 23 wherein the instructions that cause the one or more processors to determine the load placed on the main shaft flange of the wind turbine comprise instructions that, when executed, cause the one or more processors to determine loads placed on one or more individual wind turbine blades.

27. The memory device of claim 23 wherein the instructions that cause the one or more processors to cause one or more blades of the wind turbine to change pitch comprise instructions that, when executed, cause the one or more processors to change a pitch of one or more of the wind turbine blades to reduce the asymmetrical nature of the determined load.

* * * * *

UNITED STATES PATENT AND TRADEMARK OFFICE
CERTIFICATE OF CORRECTION

| | | |
|---|---|---|
| PATENT NO. | : 7,160,083 B2 | Page 1 of 1 |
| APPLICATION NO. | : 10/357522 | |
| DATED | : January 9, 2007 | |
| INVENTOR(S) | : Kirk G. Pierce and David Lawrence LeMieux | |

It is certified that error appears in the above-identified patent and that said Letters Patent is hereby corrected as shown below:

IN THE SPECIFICATION
Please add this paragraph on column 1, line 3

Government Interest

This Invention was made with Government support under NREL Subcontract No. ZAM-7-13320-26, Prime Contract DE-AC36-83CH10093 awarded by the Department of Energy. The Government has certain rights in this invention.

Signed and Sealed this

Twenty-fourth Day of April, 2007

JON W. DUDAS
*Director of the United States Patent and Trademark Office*